US 6,741,556 B1

(12) United States Patent
Seddigh et al.

(10) Patent No.: US 6,741,556 B1
(45) Date of Patent: May 25, 2004

(54) METHOD FOR CLASSIFYING PERSISTENT TCP FLOWS

(75) Inventors: Nabil N. Seddigh, North Gower (CA); Biswajit B. Nandy, Kanata (CA); Yajun Liu, Nepean (CA); Carl F. Cao, Nepean (CA); Don W. Bennett, Ottawa (CA); Dabin Wang, Nepean (CA)

(73) Assignee: Nortel Networks Limited (CA)

( * ) Notice: Subject to any disclaimer, the term of this patent is extended or adjusted under 35 U.S.C. 154(b) by 691 days.

(21) Appl. No.: 09/672,979

(22) Filed: Sep. 29, 2000

(51) Int. Cl.[7] .................... H04L 12/28; H04L 12/56

(52) U.S. Cl. ................. 370/229; 370/389; 370/338

(58) Field of Search ................. 370/351–356, 370/389, 338, 349, 395.21, 395.2, 395.4, 395.41, 395.42, 395.43, 468, 229, 230, 230.1, 235, 401, 470, 428, 412

(56) References Cited

U.S. PATENT DOCUMENTS

| | | | |
|---|---|---|---|
| 6,330,226 B1 * | 12/2001 | Chapman et al. ............ | 370/232 |
| 6,567,408 B1 * | 5/2003 | Li et al. ................ | 370/395.31 |
| 6,598,034 B1 * | 7/2003 | Kloth ......................... | 706/47 |
| 6,654,363 B1 * | 11/2003 | Li et al. ..................... | 370/338 |

OTHER PUBLICATIONS

"Automatic Quality of Service in IP Networks," Alan Chapman, Nortel Technology; H. T. Kung, Harvard University.
"Automatic Quality of Service in IP Networks," Alan Chapman, Nortel Technology; H. T. Kung, Harvard University, Canadian Conference on Broadband Research, Ottawa, Canada, Apr. 1997, pp. 184–189.

\* cited by examiner

*Primary Examiner*—Ajit Patel
(74) *Attorney, Agent, or Firm*—Steubing McGuinness & Manaras LLP

(57) ABSTRACT

A method and apparatus for dynamically classifying TCP-based traffic, is presented herein. In accordance with an embodiment of the invention, the method includes defining a first class to classify TCP data streams requiring interactive data transactions, a second class to classify TCP data streams requiring small data transactions, and a third class to classify TCP data streams requiring large data transactions. A rule set containing rules to define transitions between the defined classes, is established and an incoming TCP data stream as pertaining to the first class and detects attributes of the TCP data stream. The TCP data stream may include a single data transaction or may include a plurality of data transactions. Based on the detected attributes and the rules, the method dynamically classifies the TCP data stream into one of the defined classes. The method further includes forcing the classified TCP data stream to transition back to the first class in response to detecting that a data transaction has terminated or commenced.

36 Claims, 5 Drawing Sheets

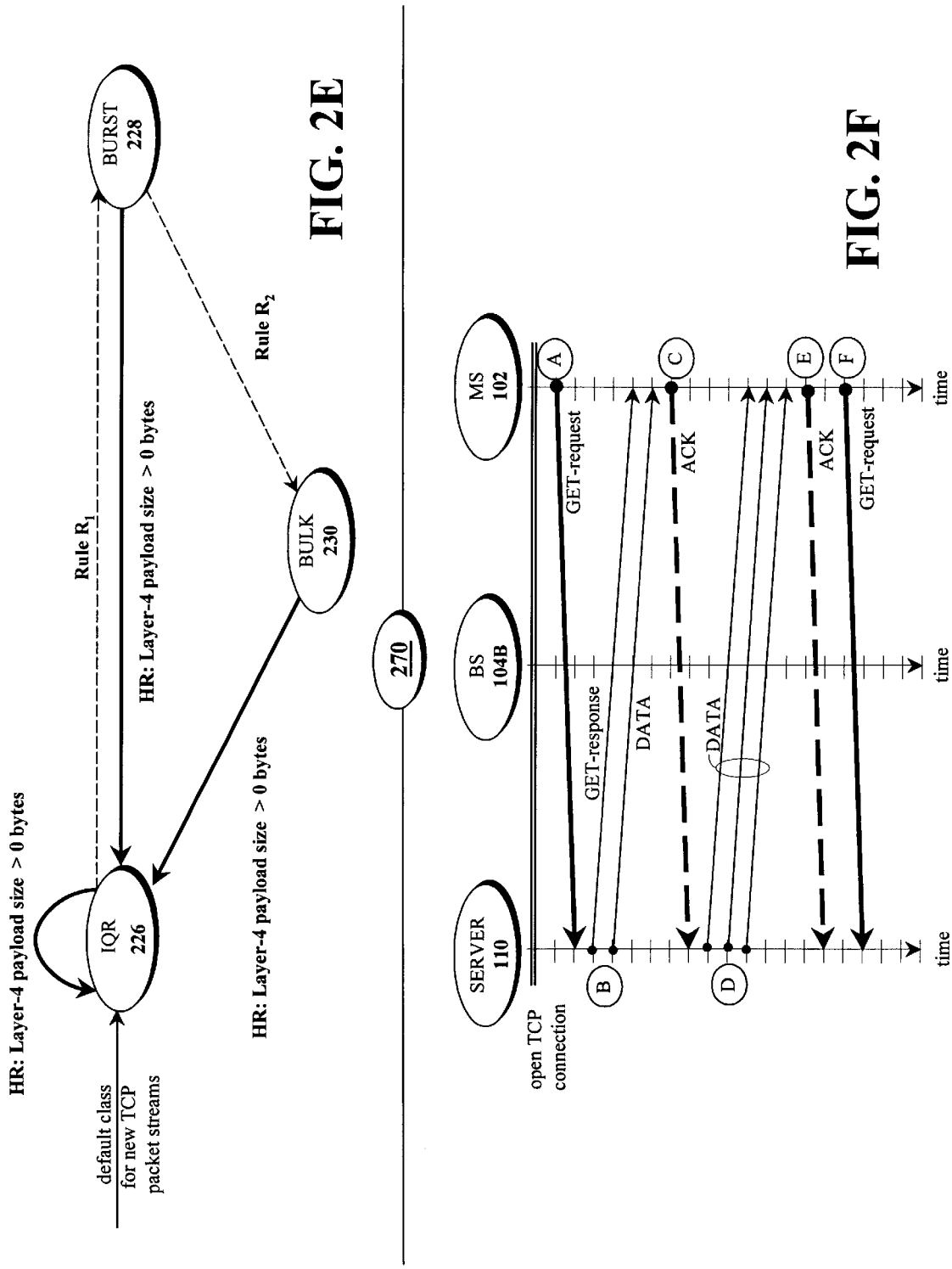

METHOD FOR CLASSIFYING PERSISTENT TCP FLOWS

BACKGROUND OF THE INVENTION

1. Field of the Invention

This invention generally relates to the field of data communication systems. More particularly, the invention presents a novel method and apparatus for dynamically classifying and supporting network traffic, based on traffic characteristics. The scheme also provides support for accurate classification of persistent TCP traffic streams.

2. Description of Related Art and General Background

The unprecedented growth of the Internet has not only increased the amount of traffic that communication networks must support, it has also transformed the nature of network traffic. The Internet was once relegated to handling Internet Protocol (IP)-based transmissions in the form of Telnet, e-mail, and File Transfer Protocol (FTP) traffic originating from wired LAN/WAN networks. Since then, the Internet has evolved into a global information infrastructure capable of accommodating a wide variety of applications and platforms.

Recent efforts have focused on the research and development of a Wireless Internet, capable of providing users with ubiquitous Internet access over wireless communication channels. Such efforts include, for example, developing standards for $3^{rd}$ generation wireless networks (3G) to facilitate Wireless Internet services. These services may accommodate IP-based applications over wireless media and would support applications as diverse as e-mail, web browsing, Voice-over-IP (VoIP), and audio/video-based applications.

FIG. 1A depicts a simplified block diagram of wireless communications network 100, capable of supporting Wireless Internet services. During reverse link transmissions, a mobile station (MS) 102 wirelessly communicates with a Wireless Access Network (WAN) 104 to transmit radio frames conveying IP-based traffic destined for application server 110. WAN 104 comprises, inter alia, a base station transceiver system (BTS) 104A, a base station (BS) 104B, and a network routing device 104C. BTS 104A receives the radio frames and routes them to BS 104B for processing, including converting the frames into IP packet data and applying radio resource management (RRM) functionality. BS 104B then forwards the IP packet data to network routing device 104C, which transmits the packets to application server 110 via a communications network 108, such as, for example, the Public Switched Telephone Network (PSTN) or the Internet.

The use of IP-based applications having real-time interactive requirements coupled with the relatively limited bandwidth capacity of wireless networks, precipitates the need to differentiate between the different traffic streams generated by these applications. For example, BS 104B and routing device 104C may need to apply delay and loss differentiation between the different packets transmitted from the wired network destined for MS 102. As such, BS 104B and routing device 104C may employ a classification mechanism 104D configured to classify certain types of traffic into a set of coarse traffic classes based on application requirements. The RRM functionality of BS 104B may then apply differentiated treatment to the different traffic classes.

One type of traffic generally found in IP-based networks is Transfer Control Protocol (TCP) traffic. As is well known, TCP is a connection-oriented protocol, which guarantees the delivery and sequential order of the transmitted data. Some classification schemes classify TCP traffic based on Layer-4 Port Numbers. Although relatively simple to implement, such classification may be easily deceived by users manipulating port numbers to achieve higher levels of priority for applications. Moreover, the use of port numbers in applications, although well-known, are not mandatory, thereby comprising the efficacy of the Layer-4 classification schemes. In addition, many networks employ Internet Protocol Security (IPSec) techniques, which provide for the secure exchange of packets, but do so at the expense of encrypting information above Layer-3 (Network Layer), thus rendering Layer-4 classification futile.

Other classification schemes classify TCP traffic based on Layer-7 (Application Layer) content. Such classification schemes exploit the payload information resident in the data packet to better identify the type of application associated with the traffic and overcomes the limitations of Layer-4 classification schemes noted above. However, Layer-7 classification schemes require a larger, more robust set of rules to operate effectively and is still subject to the classification barriers imposed by IPSec techniques.

Recent efforts, as described in Chapman et al., *Automatic Quality of Service in IP Networks*, PROC. CANADIAN CONF. ON BROADBAND RESEARCH, Ottawa, Canada (April 1997, pp. 184–189), have investigated the use dynamic stream classification schemes, which classifies streams based on traffic characteristics Dynamic stream classification schemes examine certain stream characteristics, such as, for example, transmitted packet counts and inter-arrival times, to determine the class associated with the traffic stream. The set of rules associated with dynamic stream classification schemes are, therefore, proportional to the number of classes in the classification scheme. As such, the rule set maintained by these schemes are smaller than the Layer-7 classification schemes. Moreover, because, dynamic stream classification schemes examine traffic stream behavior, such schemes may overcome the classification barriers imposed by IPSec techniques.

With this said, it is important to note that for some new applications, dynamic classification schemes may prove deficient. Consider, for example, HyperText Transfer Protocol (HTTP) 1.1, a newer protocol used by the World Wide Web to effect interactive transfers. HTTP 1.1 defines how messages are formatted and transmitted, and what actions Web servers and browsers should take in response to various commands. One of the main features of HTTP 1.1 is the ability to support persistent TCP connections. Persistent TCP connections allow for the transfer of multiple transactions using a single TCP connection. Allowing multiple transactions over a single connection results in managing fewer connections, which enhances system performance. However, applying dynamic classification schemes to persistent TCP connections may result in classifying all transactions within the connections, irrespective of their characteristics, in the same manner, thereby compromising the efficacy and accuracy of the differentiated treatment of network traffic.

SUMMARY OF INVENTION

The present invention addresses the need identified above by providing a method and apparatus capable of dynamically and accurately classifying network traffic based on traffic characteristics.

Methods and apparatuses consistent with the principles of the present invention, as embodied and broadly described herein, include defining a first class to classify TCP data streams requiring interactive data transactions and a second class to classify TCP data streams requiring burst data transactions. The method establishes a rule set containing rules to define transitions between the defined classes and initializes an incoming TCP data stream as pertaining to one of the defined classes. Attributes of the TCP data stream are detected and, based on the detected attributes and the rules, the method dynamically classifies the TCP data stream into one of the defined classes. The method further includes forcing the classified TCP data stream to transition back to the initialized class in response to detecting that a data transaction has terminated or commenced.

By directing the classification of a TCP data stream (e.g., forcing the TCP classification back to the initialized class) based on detecting the termination or commencement of a data transaction, the present invention accurately classifies network traffic. Such classification is achieved regardless of whether the TCP data stream contains a single data transaction or a plurality of data transactions.

Other aspects and features of the present invention will become apparent to those of ordinary skill in the art upon review of the following description of specific embodiments of the invention in conjunction with the accompanying figures.

BRIEF DESCRIPTION OF THE DRAWINGS

FIG. 2E illustrates the operation of another heuristic rule, constructed and operative in accordance with another embodiment of the present invention.

FIG. 2F illustrates the HTTP data transfer operations between a mobile station and a server.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

The method and apparatus for dynamically classifying TCP-based traffic, as described herein, is capable of classifying network traffic based on application requirements as well as classifying individual transactions within persistent TCP connections. A plurality of classes are defined to classify TCP data streams having different application or transactional requirements. A rule set is established for transitioning between the defined classes. The TCP data streams are then classified dynamically based on the rule set and certain detected data stream attributes. In addition, the method forces the classified data stream back to an initial class, in response to detecting the termination or commencement of a transaction.

In one embodiment, the termination of a transaction is indicated by detecting a TCP data stream with packet inter-arrival time that is greater than a pre-specified time. In an alternative embodiment, the termination of a transaction is indicated by detecting a TCP data stream having a packet inter-arrival time that is greater than the round trip time of the stream. In another embodiment, the commencement of a transaction is indicated by monitoring the reverse TCP flow and detecting a TCP data stream message from a MS to a server that contains a payload size greater than zero.

Figure 1A:
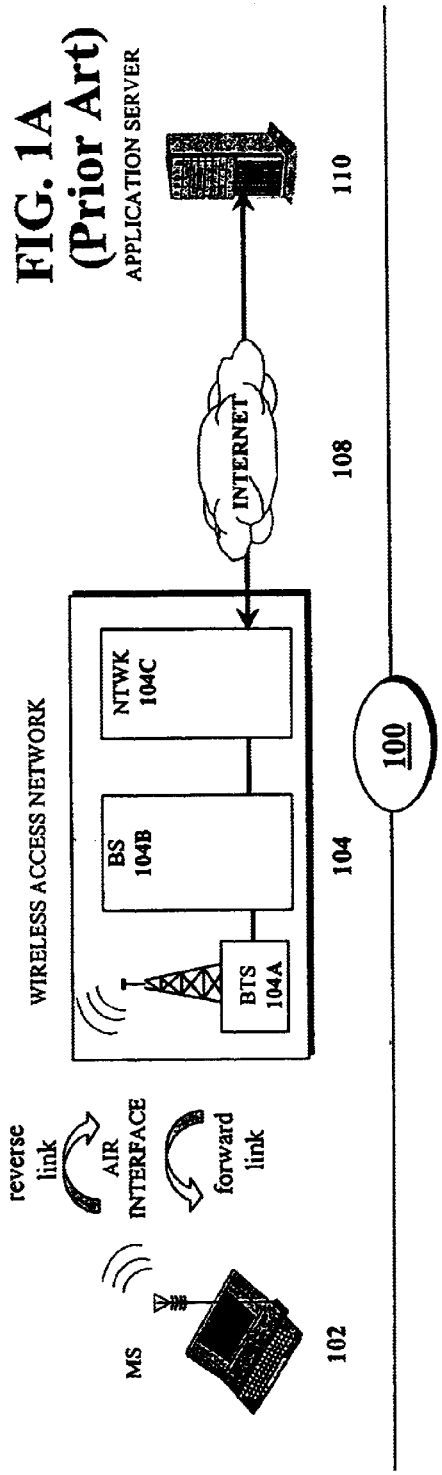
FIG. 1A depicts a simplified block diagram of wireless communications network.
Figure 1B:
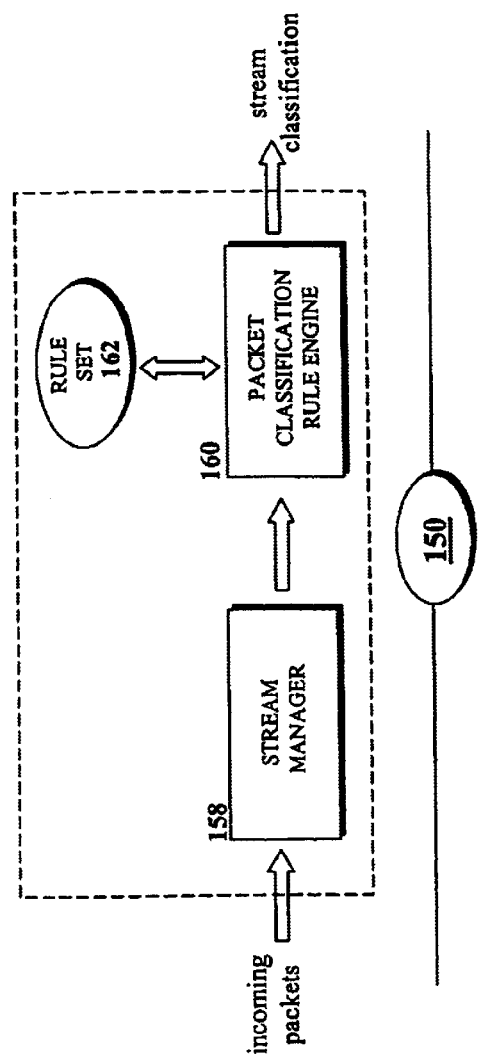
FIG. 1B illustrates a simplified block diagram of a classification mechanism, in accordance with an embodiment of the present invention.

FIG. 1B is a functional block diagram depicting classification mechanism 150, constructed and operative in accordance with an embodiment of the present invention. Mechanism 150 classifies network traffic based on certain classification schemes described below and comprises a stream manager mechanism 158, a packet classification rule engine 160, and rule set 162. Stream manager mechanism 158 may be configured to receive the incoming data packets as well as identify and track the traffic streams associated with the received packets.

Packet classification rule engine 160 performs actions to classify the received packets into their proper class in response to the information provided by stream manager mechanism 158 and rule set 162. Rule set 162 includes a plurality of rules designed to perform comparisons between observed traffic attributes and a pre-specified value, in accordance with the classification schemes presented below. As such, rule set 162 may include event indicia, indicating the triggering of a rule, condition indicia, representing a conditional or comparison statement, and action indicia, indicating the execution of an action based on the results of the comparison.

Figure 2A:
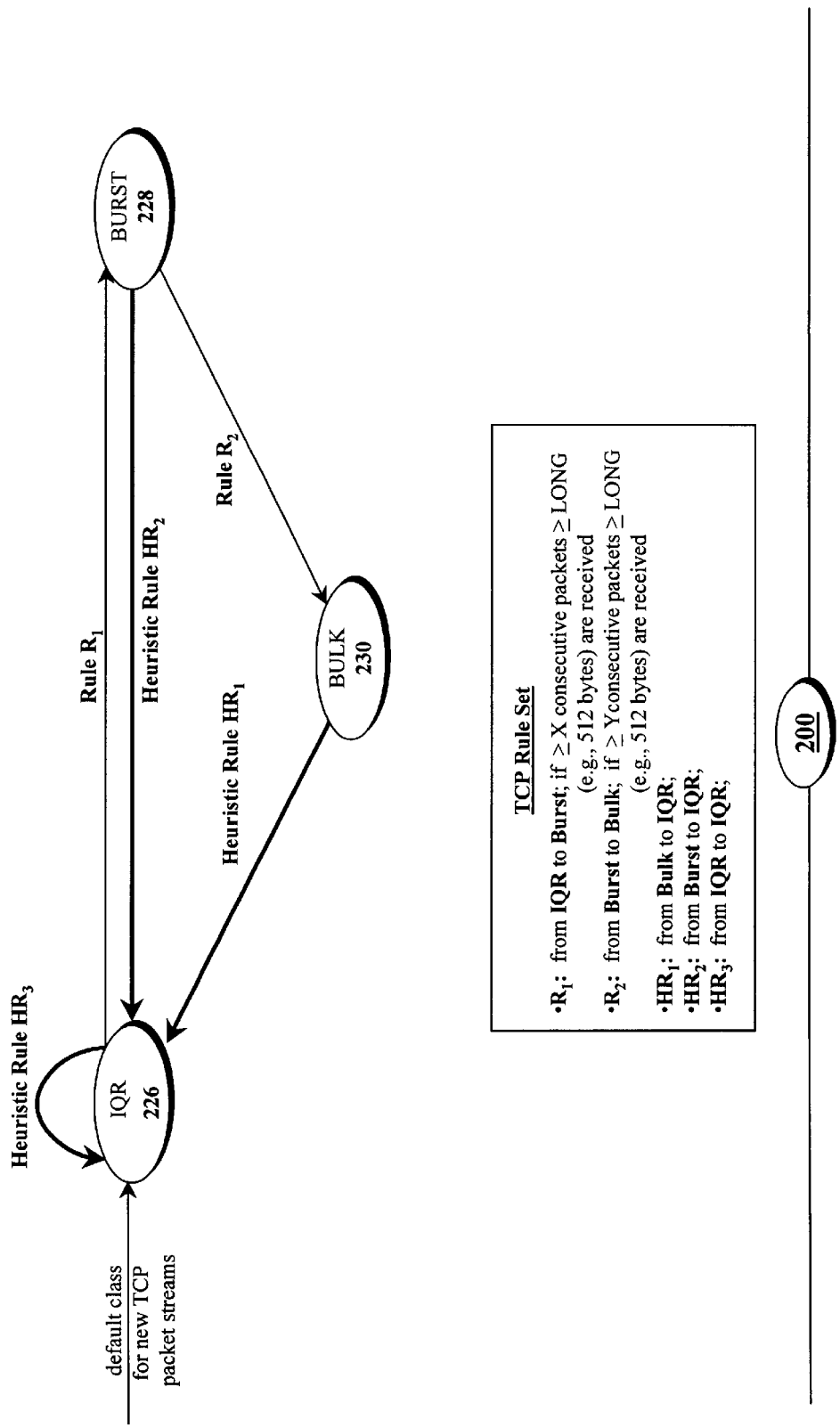
FIG. 2A depicts a functional state diagram for the accurate classification of TCP-based traffic, in accordance with an embodiment of the present invention.

FIG. 2A depicts a TCP classification state diagram 200, constructed and operative in accordance with an embodiment of the present invention. Classification state diagram 200 provides an illustration of a dynamic classification scheme capable of classifying TCP traffic, including classifying individual transactions within persistent TCP connections. Such a scheme may be implemented by a classification mechanism 104D located in BS 104B and/or network routing device 104C, for example.

As indicated in FIG. 2A, classification state diagram 200 defines 3 classes of TCP traffic, Interactive Query Response (IQR) class 226, Burst class 228, and Bulk class 230. The traffic streams are initialized with a default class, such as, for example, IQR class 226. Upon detecting certain characteristics of the traffic streams (discussed below), classification state diagram 200 transitions into the appropriate class in order to classify the traffic streams. It is to be noted that other traffic classes are possible and in no way are the described embodiments limited to the classes identified above. As such, other traffic classes may be defined, for example, in accordance with the types of applications accommodated by a network and/or the differentiated treatment sought.

Interactive Query Response (IQR) class 226 represents traffic comprising a small number packets that need to be transmitted with high priority and little delay due to the interactive nature of the application (e.g., web-based e-commerce and Telnet traffic). Burst class 228 represents traffic comprising a medium number of packets that are transmitted in an infrequent and bursty manner (e.g., small HTTP and Post Office Protocol (POP3) traffic). Bulk class 230 represents traffic comprising a large number packets that are capable of tolerating delays due to large volume transfers (e.g., large Hypertext Markup Language (HTML) and File Transfer Protocol (FTP) traffic).

As indicated in FIG. 2A, the dynamic classification scheme defaults all new TCP traffic streams to IQR class 226, and then based on the observed traffic characteristics, the streams are classified into the appropriate classes. For example, in accordance with rule $R_1$, if at least X consecutive TCP packets having a size greater than or equal to LONG are detected, IQR class 226 transitions to Burst class 228. Such a rule may be implemented in order to adequately track and classify consecutive long packets having an occasional short packet for separation. Similarly, in accordance with rule $R_2$, if Y consecutive TCP packets having a size greater than or equal to LONG are detected, Burst class 228 transitions to Bulk class 230. The occurrence of consecutive long packets implies a train of packets with size larger than LONG. Such a traffic characteristic is reflective of either Burst class 228 or Bulk class 230 data transfer, where packet sizes are maximized as the applications tries to send all its data as fast as possible. The values for rule parameters X, Y, and LONG may be configurable. Possible values for these parameters may include: X=2–6 consecutive packets, Y=10–20 consecutive packets, LONG=512 bytes. It is to be noted, that the present invention is not limited to the specified values.

In order to accurately identify transactions occurring within persistent TCP connections, all three class states may be configured to transition back to IQR class 226 after each transaction is completed, or equivalently, at the commencement of a new transaction. Such transitions may be implemented by forcing transitions back to IQR class 226 in response to observing certain traffic characteristics stipulated by heuristic rules $HR_1$, $HR_2$, and $HR_3$. In addition, heuristic rules $HR_1$, $HR_2$, and $HR_3$ may also be implemented to accommodate idle periods occurring in TCP connections.

It will be appreciated that, although each of heuristic rules $HR_1$, $HR_2$, and $HR_3$ may be distinct, for the purposes of clarity, the embodiments disclosed heretofore will be described in terms of one heuristic rule. It will be understood that each of the embodiments may be used independently of each other or in different combinations in accordance with different traffic class configurations as applied to heuristic rules $HR_1$, $HR_2$, and $HR_3$.

Figure 2B:
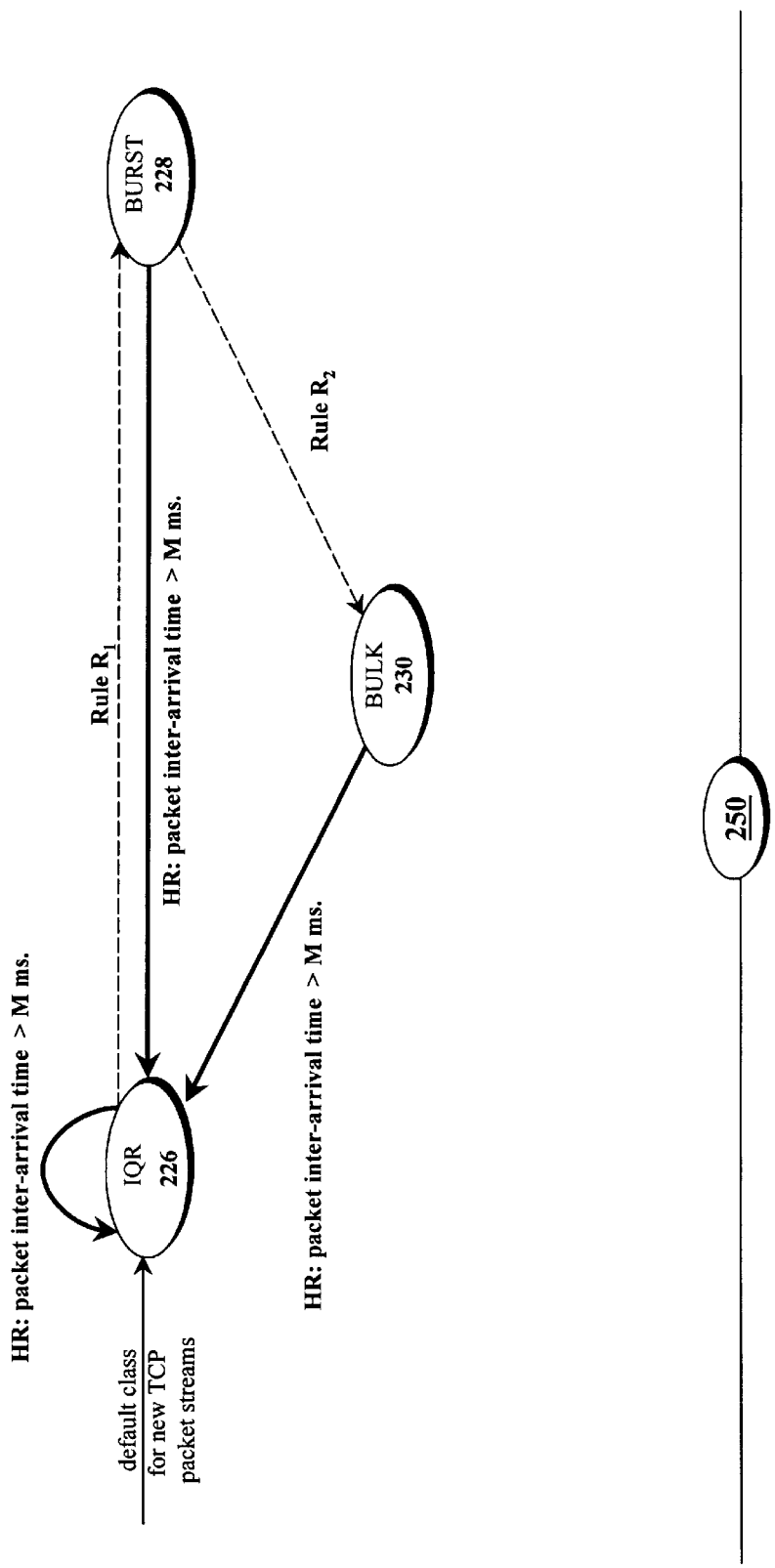
FIG. 2B illustrates the operation of a heuristic rule, constructed and operative in accordance with an embodiment of the present invention.

FIG. 2B depicts the implementation of heuristic rule HR 250 based on maximum inter-arrival times, constructed and operative in accordance with an embodiment of the present invention. As indicated in FIG. 2B, HR 250 forces the transition of IQR class 226, Burst class 228, or Bulk class 230 back to IQR class 226, if the packet inter-arrival time for a corresponding traffic stream is greater than M. The value of inter-arrival parameter M is static and the arrival times of packets are easily detected. As such, the detection of prolonged inter-arrival times may indicate that a transaction within a persistent TCP connection has been completed or that the connection is idle. A typical value for inter-arrival M is 100 ms. It is to be noted, however, that the present invention is not limited to this specific value.

Because the value of inter-arrival parameter M is static, it may be susceptible to the dynamic fluctuations of network traffic. Thus, inter-arrival parameter M is selected in a manner that minimizes false transitions. For example, if the value of M is too small, it may incorrectly force traffic streams in the middle of transmitting a transaction back to IQR class 226. Conversely, if the value of M too large, it may not force traffic streams with smaller transmission delays back to IQR class 226 when transactions are completed.

In addition, HR 250 may not operate effectively in the case of persistent HTTP, where application server 110 is capable of supporting pipelined requests. For example, as will be described below, requests to initiate a transaction from a MS 102 to a server 110 i.e., GET requests) may appear back-to-back. The requests may be queued at server 110 and the responses to the requests may be issued in succession with little, if any, delay. These delays may be smaller than inter-arrival parameter M and, thus, the corresponding streams may not be forced back to IQR class 226 after the transactions corresponding to the responses are complete.

Figure 2C:
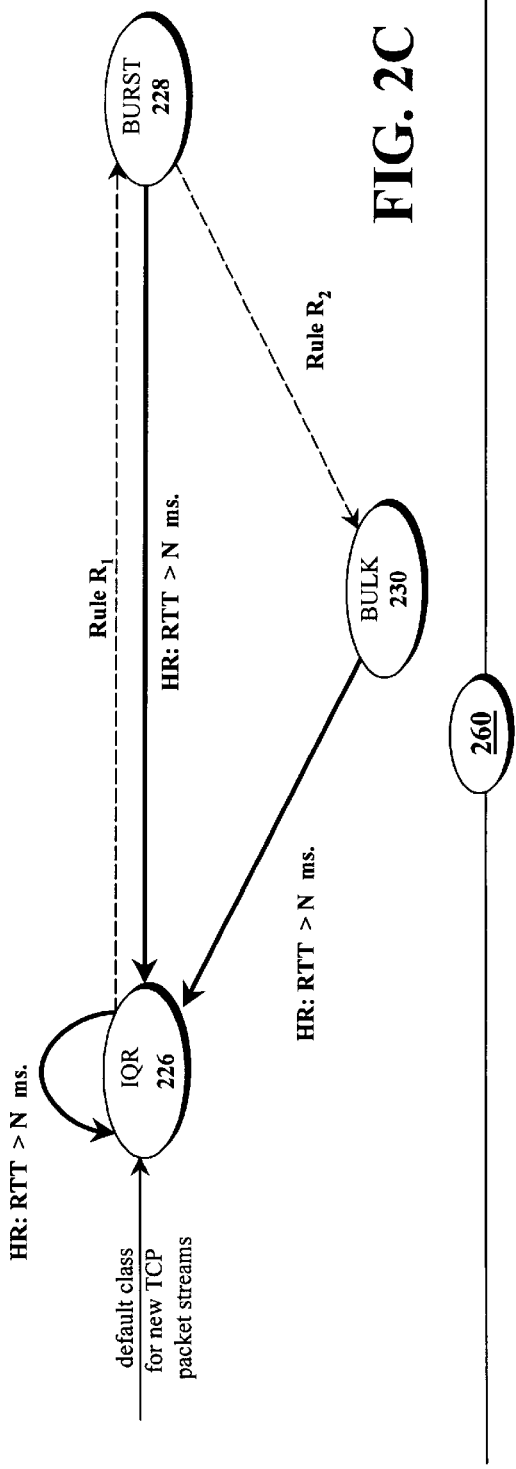
FIG. 2C illustrates the operation of a heuristic rule, constructed and operative in accordance with another embodiment of the present invention.

FIG. 2C depicts the implementation of heuristic rule HR 260 based on the maximum round trip time (RTT) for the traffic stream, constructed and operative in accordance with another embodiment of the present invention. As indicated in FIG. 2C, HR 260 forces the transition of IQR class 226, Burst class 228, or Bulk class 230 back to IQR class 226, if lapsed time N is greater than the RTT for a traffic stream. In particular, if no packets are detected from application server 110 for interval greater than the RTT, it is assumed that a new transaction has started.

Because the value of lapsed time parameter N depends on the RTT for a particular traffic stream, parameter N is dynamic. As such, HR 260 is not as susceptible to dynamic traffic fluctuations and is, therefore, more robust than HR 250, which implements a static value M.

Figure 2D:
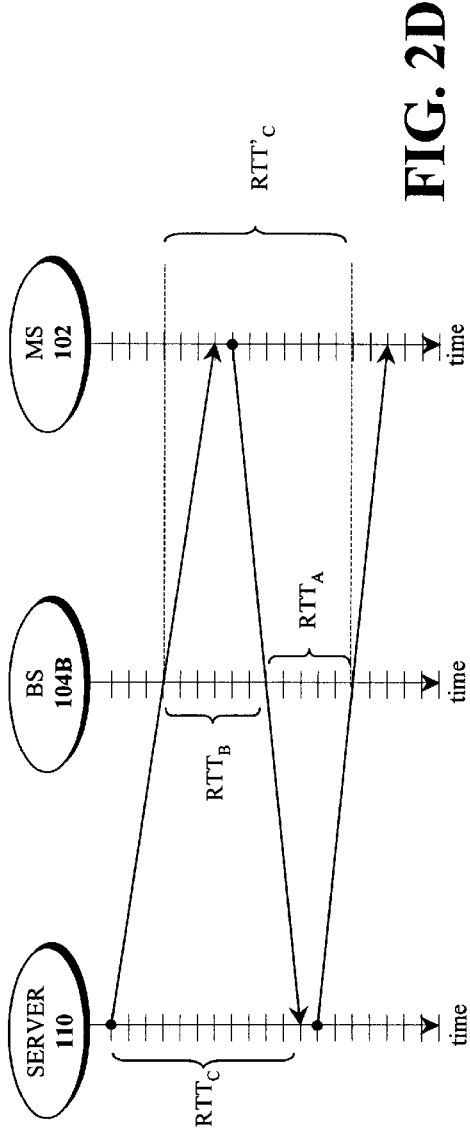
FIG. 2D depicts the round trip time delay between a mobile station and a server.

The implication of HR 260 is that BS network routing device 104C has a way of estimating the RTT of a traffic stream. There are well-known techniques that estimate the RTT of a traffic stream based on correlating the forward and reverse-direction streams. As indicated in FIG. 2D, there are two possibilities for the RTT value for N. One possibility, is to consider the RTT between the BS network routing device 104C and application server 110 ($RTT_A$). The other possibility is to consider the RTT between server 110 and MS 102 ($RTT_C$).

Because the behavior of the traffic streams is governed by end-to-end flow control between server 110 and MS 102, HR 260 depends on the RTT between server 110 and MS 102 (i.e., $RTT_C$) and not between BS network routing device 104C and server 110 (i.e., $RTT_A$). At the BS 104B, the $RTT_C$ information is not available. Thus, BS 104B has to obtain an estimate for $RTT_C$, $RTT'_C$ via the formula: $RTT_C \approx RTT_A + RTT_B$, where $RTT_A$ and $RTT_B$ are obtained independently.

As noted above, using the RTT to dynamically adjust the value of N improves on the scheme based on the static value for M. However, recent studies have indicated the variability of RTT on the Internet. This variability is primarily due to fluctuations in router queue sizes. If the RTT variability is too high, HR 260 may be subject to false transitions.

Moreover, in the case of time-outs, BS network routing device 104C may observe delays larger than RTT and may transition back to IQR class 226. For example, if multiple consecutive packets are dropped, time-outs occur in order to retransmit the packets. Generally, the timeout interval is longer than RTT, thereby causing spurious state transitions. Such transitions may not be desired. In particular, if a particular traffic stream has been designated as pertaining to Bulk class 230, even though the traffic stream experiences a time-out, it may still be desirable to keep that flow in Bulk class 230.

Furthermore, much like HR 250, HR 260 may not operate effectively in the case of persistent HTTP, where application server 110 supports pipelined requests. In such a case, multiple GET requests may be queued at server 110 and responses may be issued sequentially without a sufficient RTT delay. Thus, the delays may be smaller than inter-arrival parameter N and the corresponding streams may not be forced back to IQR class 226 after the transactions corresponding to the responses are complete.

FIG. 2E depicts the implementation of heuristic rule HR 270 based on the Layer-4 payload size for the traffic stream, constructed and operative in accordance with another embodiment of the present invention. As indicated in FIG. 2E, HR 270 forces the transition of IQR class 226, Burst class 228, or Bulk class 230 back to IQR class 226, if it detects a MS 102 message request having a Layer-4 payload size greater than 0 for a particular traffic stream.

A sample data transfer for HTTP 1.1 is depicted in FIG. 2F. As indicated by reference character A, after a TCP connection is established (i.e., TCP handshaking process is complete), MS 102 transmits a GET request to server 110 to initiate a transaction. The GET request packet manifests a non-zero Layer-4 payload size. Server 110 responds to the GET request by transmitting a GET response along with data, as noted by reference character B. In turn, MS 102 acknowledges the transmitted data by responding with an ACK message, as indicated by reference character C. The ACK message packet has a 0 Layer-4 payload size. Server 110 transmits the rest of the data, as noted by D, to which MS 102 responds with another ACK message, noted by E. To initiate a subsequent transaction, MS 102 transmits another GET request to server 110, having a non-zero Layer-4 payload size, as indicated by reference character F.

HR 270 is based on the observation that, after the TCP handshaking process is complete, data transactions from server 110 to the MS 102 are initiated by non-zero Layer-4 payload size requests from MS 102, while non data-related messages from MS 102 have 0 Layer-4 payload size. As such, HR 270 exploits the fact that non-zero packets from MS 102 to server 110 mark the beginning of a new request and a new transaction, and thus the corresponding traffic stream should transition back to IQR class 226.

It will be appreciated that for simplicity, only data transfers from server 110 to MS 102 are illustrated in FIG. 2F. However, HR 270 may also be applied to data transfers from MS 102 to server 110, such as, for example, e-business transactions, where a client enters information on a form-based HTML page. In addition, HR 270 is capable of handling HTTP pipelining.

It is to be noted that, HR 270 assumes that there is no pipelining of GET requests. If GET requests pipelining is a requirement, HR 270 may be modified to track multiple GET requests and detect the corresponding ACK messages sequentially.

It will be apparent to one of ordinary skill in the art that the functionality described in connection with the embodiments as described herein may be implemented in many different embodiments of software, firmware, and hardware. The actual software code or specialized control hardware used to implement the present invention is not limiting of the present invention. Thus, the operation and behavior of the embodiments will be described without specific reference to the actual software code or specialized hardware components. The absence of such specific references is feasible because artisans of ordinary skill would be able to design software and control hardware to implement the embodiments of the present invention based on the description herein, without undue experimentation.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by the system.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method for dynamically classifying TCP-based traffic, comprising:
   defining a first class to classify TCP data streams requiring interactive data transactions;
   defining a second class to classify TCP data streams requiring burst data transactions;
   establishing a rule set containing a plurality of rules to define transitions between said defined classes;
   initializing an incoming TCP data stream as pertaining to one of said classes;
   detecting attributes of said TCP data stream; and
   dynamically classifying said TCP data stream into one of said classes based on said detected attributes and said rule set,
   wherein said rule set includes forcing said classified TCP data stream to transition back to said initialized class in response to detecting an indication that a data transaction corresponding to said TCP data stream has at least one of terminated and commenced.

2. The method of claim 1, further including defining a third class to classify TCP data streams requiring bulk data transactions.

3. The method of claim 2, wherein said TCP data stream includes a plurality of data transactions.

4. The method of claim 3, wherein said rule set comprises,
   event indicia for indicating the invocation of one of said plurality of rules based on said detected attributes of said TCP data stream,
   condition indicia for representing a comparison or condition between said one of said plurality of rules and a pre-specified value, and action indicia for indicating the execution of a transition based on results of said comparison.

5. The method of claim 4, wherein said initialized class is said first class.

6. The method of claim 5, wherein said rule set provides for the transition of said TCP data stream from said first class to said second class in response to detecting a data stream with a pre-specified number of packets having a packet size greater than a pre-specified size.

7. The method of claim 6, wherein said rule set provides for the transition of said TCP data stream from said second class to said third class in response to detecting a data stream with a pre-specified number of packets having a packet size greater than a pre-specified size.

8. The method of claim 7, wherein said detecting an indication that a corresponding data transaction has at least one of terminated and commenced is based on detecting a packet inter-arrival time for said TCP data stream that is greater than a pre-specified time.

9. The method of claim 7, wherein said detecting an indication that a corresponding data transaction has at least one of terminated and commenced is based on detecting a packet inter-arrival time for said TCP data stream that is greater than a round trip time for said TCP data stream.

10. The method of claim 9, wherein said detecting said round trip time for said TCP data stream is based on the lapsed time interval as said packet travels from a base station to a mobile station and the lapsed time interval as said packet travels from said base station to a corresponding server mechanism servicing said TCP data stream.

11. The method of claim 7, wherein said detecting an indication that a corresponding data transaction has at least one of terminated and commenced is based on detecting a message request having a payload size associated with said TCP data stream that is greater than zero.

12. The method of claim 11, wherein said message request is transmitted by a mobile station in order to initiate a data transaction between said mobile station and a corresponding server mechanism servicing said TCP data stream.

13. A machine-readable medium encoded with a plurality of processor-executable instruction sequences for dynamically classifying TCP-based traffic, said instruction sequences comprising:
  defining a first class to classify TCP data streams requiring interactive data transactions;
  defining a second class to classify TCP data streams requiring burst data transactions;
  establishing a rule set containing a plurality of rules to define transitions between said classes;
  initializing an incoming TCP data stream as pertaining to one of said classes;
  detecting attributes of said TCP data stream; and
  dynamically classifying said TCP data stream into one of said classes based on said detected attributes and said rule set,
  wherein said rule set includes forcing said classified TCP data stream back to said initialized class in response to detecting an indication that a data transaction corresponding to said TCP data stream has at least one of terminated and commenced.

14. The machine readable medium of claim 13, further including defining a third class to classify TCP data streams requiring bulk data transactions.

15. The machine-readable medium of claim 14, wherein said dynamically classifying said TCP data stream includes classifying different transactions within a single TCP connection.

16. The machine-readable medium of claim 15, wherein said rule set comprises,
  event indicia for indicating the invocation of one of said plurality of rules based on said detected attributes of said TCP data stream,
  condition indicia for representing a comparison or condition between said one of said plurality of rules and a pre-specified value, and
  action indicia for indicating the execution of a transition based on results of said comparison.

17. The machine-readable medium of claim 16, wherein said initialized class is said first class.

18. The machine-readable medium of claim 17, wherein said rule set provides for the transition of said TCP data stream from said first class to said second class in response to detecting a data stream with a pre-specified number of packets having a packet size greater than a pre-specified size.

19. The machine-readable medium of claim 18, wherein said rule set provides for the transition of said TCP data stream from said second class to said third class in response to detecting a data stream with a pre-specified number of packets having a packet size greater than a pre-specified size.

20. The machine-readable medium of claim 19, wherein said detecting said indication that a corresponding data transaction has at least one of terminated and commenced is based on detecting a packet inter-arrival time for said TCP data stream that is greater than a pre-specified time.

21. The machine-readable medium of claim 19, wherein said detecting said indication that a corresponding data transaction has at least one of terminated and commenced is based on detecting a packet inter-arrival time for said TCP data stream that is greater than a round trip time for said TCP data stream.

22. The machine-readable medium of claim 21, wherein said detecting said round trip time for said TCP data stream is based on the lapsed time interval as said packet travels from a base station to a mobile station and the lapsed time interval as said packet travels from said base station to a corresponding server mechanism servicing said TCP data stream.

23. The machine-readable medium of claim 19, wherein said detecting said indication that a corresponding data transaction has at least one of terminated and commenced is based on detecting a message request having a payload size associated with said TCP data stream that is greater than zero.

24. The machine-readable medium of claim 23, wherein said message request is transmitted by a mobile station in order to initiate a transaction between said mobile station and a corresponding server mechanism servicing said TCP data stream.

25. An apparatus for classifying TCP-based traffic, comprising:
  a data stream managing mechanism configured to identify, track, and manage a TCP data stream;
  a rule set including a plurality of rules defining transitions between a plurality of defined traffic classes;
  a classification rule engine configured to classify said TCP data stream into one of a plurality of traffic classes,
  wherein said classification rule engine defines a first class to classify TCP data streams requiring containing data transactions of an interactive type, defines a second class to classify TCP data streams containing data transactions of a burst type, initializes said TCP data stream as pertaining to one of said defined classes, detects attributes of said TCP data stream, and dynamically classifies said TCP data stream into one of said classes based on said detected attributes and said rule set, and wherein said rule set includes forcing said classified TCP data stream to transition back to said initialized class in response to detecting an indication that a data transaction corresponding to said TCP data stream has at least one terminated and commenced.

26. The apparatus of claim 25, wherein said classification rule engine further defines further including defining a third class to classify TCP data streams containing data transactions of a bulk type.

27. The apparatus of claim 26, wherein said TCP data stream includes a plurality of data transactions.

28. The apparatus of claim 27, wherein said rule set comprises, event indicia for indicating the invocation of one of said plurality of rules based on said detected attributes of said TCP data stream, condition indicia for representing a comparison or condition between said one of said plurality of rules and a pre-specified value, and action indicia for indicating the execution of a transition based on results of said comparison.

29. The apparatus of claim 28, wherein said initialized class is said first class.

30. The apparatus of claim 29, wherein said rule set provides for the transition of said TCP data stream from said first class to said second class in response to detecting a data stream with a pre-specified number of packets having a packet size greater than a pre-specified size.

31. The apparatus of claim 30, wherein said rule set provides for the transition of said TCP data stream from said second class to said third class in response to detecting a data stream with a pre-specified number of packets having a packet size greater than a pre-specified size.

32. The apparatus of claim 31, wherein said classification rule engine detects an indication that a corresponding data transaction has at least one of terminated and commenced is based on detecting a packet inter-arrival time for said TCP data stream that is greater than a pre-specified time.

33. The apparatus of claim 31, wherein said classification rule engine detects an indication that a corresponding data transaction has at least one of terminated and commenced is based on detecting a packet inter-arrival time for said TCP data stream that is greater than a round trip time for said TCP data stream.

34. The method of claim 33, wherein said detecting said round trip time for said TCP data stream is based on the lapsed time interval as said packet travels from a base station to a mobile station and the lapsed time interval as said packet travels from said base station to a corresponding server mechanism servicing said TCP data stream.

35. The method of claim 31, wherein said classification rule engine detects an indication that a corresponding data transaction has at least one of terminated and commenced is based on detecting a message request having a payload size associated with said TCP data stream that is greater than zero.

36. The method of claim 35, wherein said message request is transmitted by a mobile station in order to initiate a data transaction between said mobile station and a corresponding server mechanism servicing said TCP data stream.

* * * * *